United States Patent
Velandy et al.

(10) Patent No.: US 8,634,346 B2
(45) Date of Patent: Jan. 21, 2014

(54) DYNAMIC GATEWAY SELECTION PROCESS

(75) Inventors: Rajesh Velandy, Nashua, NH (US);
Rajesh Ramankutty, Nashua, NH (US);
Pradeep Dakshayani, Hudson, NH (US); Arun C. Alex, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 338 days.

(21) Appl. No.: 12/913,524

(22) Filed: Oct. 27, 2010

(65) Prior Publication Data

US 2011/0096750 A1  Apr. 28, 2011

Related U.S. Application Data

(60) Provisional application No. 61/255,358, filed on Oct. 27, 2009.

(51) Int. Cl.
*H04L 12/28* (2006.01)
(52) U.S. Cl.
USPC ............................. 370/328; 370/331; 370/401
(58) Field of Classification Search
USPC .......................... 370/328, 331, 401
See application file for complete search history.

(56) References Cited

U.S. PATENT DOCUMENTS

| | | | | |
|---|---|---|---|---|
| 2010/0039993 | A1* | 2/2010 | Ramankutty et al. | 370/328 |
| 2010/0080886 | A1* | 4/2010 | Hourizadeh | 426/595 |
| 2010/0281151 | A1* | 11/2010 | Ramankutty et al. | 709/223 |
| 2011/0098031 | A1* | 4/2011 | Dakshayani et al. | 455/422.1 |
| 2012/0113809 | A1* | 5/2012 | Cortes Gomez | 370/235 |

OTHER PUBLICATIONS

3GPP TS 29.303.*

* cited by examiner

*Primary Examiner* — John Blanton
*Assistant Examiner* — Jay P Patel
(74) *Attorney, Agent, or Firm* — Wilmer Cutler Pickering Hale and Dorr LLP (57) ABSTRACT

A selection mechanism and a selection process are disclosed that provide the selection of a network device based on defined criteria to allow efficient use of the network and load balancing. In one embodiment, a method is disclosed that includes receiving an initial attachment at a gateway including an identifier of a radio attachment point, obtaining a name for the radio attachment point based on the identifier, accessing a list of names of packet data network gateways (PGWs) that can serve the initial attachment to provide a network connection, comparing the name for the radio attachment point with the list of names of the PGWs to determine at least one PGW that provides a closest match to the name for the radio attachment point, and selecting at least one PGW that provides the closest match to establish the network connection.

18 Claims, 5 Drawing Sheets

FIG. 5

DYNAMIC GATEWAY SELECTION PROCESS

CROSS-REFERENCE TO RELATED APPLICATIONS

This application claims benefit under 35 U.S.C. §119(e) of U.S. Provisional Patent Application No. 61/255,358, entitled "Dynamic Gateway Selection Process," filed Oct. 27, 2009, and is hereby incorporated by reference herein in its entirety.

FIELD OF THE DISCLOSURE

This disclosure relates generally to a system and method for providing dynamic gateway selection in a communication network.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology. The range of the wireless communication technology can vary depending on the deployment. A macro cell transceiver is typically used by service providers to provide coverage over about a five kilometer distance. A pico cell transceiver can provide coverage over about a half kilometer distance, and a femto cell transceiver can provide coverage over a 50-200 meter distance. A femto cell transceiver is similar in coverage to a WiFi (WLAN) access point and can be used to provide network access over a short range.

DESCRIPTION OF EXAMPLE EMBODIMENTS

Overview

In one embodiment, a method is disclosed that includes receiving an initial attachment at a gateway including an identifier of a radio attachment point, obtaining a name for the radio attachment point based on the identifier, accessing a list of names of packet data network gateways (PGWs) that can serve the initial attachment to provide a network connection, comparing the name for the radio attachment point with the list of names of the PGWs to determine at least one PGW that provides a closest match to the name for the radio attachment point, and selecting at least one PGW that provides the closest match to establish the network connection.

Example Embodiments

One of the benefits of mobile devices is their ability to send and receive data while roaming. This allows the user of a mobile device to make calls, browse web pages, and perform other functions while not being tied to a fixed location. This mobility also means that mobile devices end up receiving service from different equipment in the network depending on the location of the mobile device. For example, as a mobile device moves around a city, different radio antennas provide service to the mobile device. While the radio antenna selected to provide radio service depends on the radio antennas in range of the mobile device, the network operator has discretion over the selection of other network devices that provide service to the mobile device. These network devices can be used to route the data, authenticate the device, and manage the connection between the mobile device and the network.

Since the selection of network devices can be controlled, algorithms can be developed to provide the selection based on a variety of criteria. This criteria can include the location of the mobile device, the location of the network equipment, the load of the various network equipment, the type of the mobile device, and the service requested (e.g., voice service vs. data service). The selection of the network equipment is usually made to minimize the distances between devices in the network and to minimize delays. By minimizing the distances between devices, especially on connections that are heavily used between devices, network resources can be saved to provide increased network capacity. A selection mechanism and a selection process are disclosed that provide the selection of a network device based on defined criteria to allow efficient use of the network and load balancing. The selection mechanism can be provided on a gateway that provides one or more other functions. The selection mechanism and process can utilize identifiers that include a hierarchy to locate the geographical closeness of devices in the network relative to one another. This can be used to compare various devices in the network to make a dynamic selection.

A selection mechanism is typically used when a mobile device initially attaches (initial attach) to the network and when the mobile device is involved in a handover. An initial attach can occur when a mobile device is powered on or reconnects to the network after some time of being disconnected. A handover occurs when a mobile device is roaming and moves from an area covered by a first network device to an area covered by a second network device. The network devices are setup with coverage areas in some networks in order to minimize the length of the connections in the network so that data is not being sent over long distances using network resources. In both an initial attach and a handover, a selection of a network device to handle the connection is made.

In some embodiments, the selection mechanism can include an identification convention that provides an indication of the relative closeness of the network equipment to one another. For example, the identification can be arranged in a hierarchal fashion and have multiple segments where each segment reflecting a larger geographic area. This can be like using a city, county, state, and country in an identification to determine how close two locations are. The selection mechanism uses the hierarchal aspect of the identification to compare the IDs of the multiple devices and determine the nearest network equipment to a known location. The comparison can involve determining the identifications with the largest number of matching segments. The known location can be the location of the radio antenna or radio access network where the mobile device is attached.

In some embodiments, the network device can be an access gateway, a serving gateway, a mobility management entity, a packet data network gateway (PGW), or a high-rate packet data (HRPD) serving data gateway (HSGW). In one method, the network device can have a local configuration with its fully qualified domain name (FQDN) using the hierarchal identification. In this method, it is assumed that the network equipment serves a single region or coverage area, rather than multiple coverage areas. The FQDN can be the identifier described above that has a hierarchal naming convention to determine relative geographical closeness of network devices.

A second method can allow the network equipment to serve multiple regions or coverage areas, among other things. Here the geographical location of the radio attachment point is used by the selection mechanism to select a network device. The location of the radio attachment point can be determined by using a radio transceiver identifier such as a base station identification (BSID), cell identification (CID), a system identification (SID), a network identification (NID), an access point name (APN), or a packet zone identification (PZID), for example. These radio antenna identifiers can be resolved into a region domain name server (DNS) label by using a domain name server (DNS). A comparison of the region DNS label can then be performed to determine the one or more network devices best suited to serve the user equipment (UE) attached at that radio antenna. If more than one network device is found, then they are considered as serving the same region and additional algorithms can be used by the selection mechanism to choose the network device.

Figure 1:
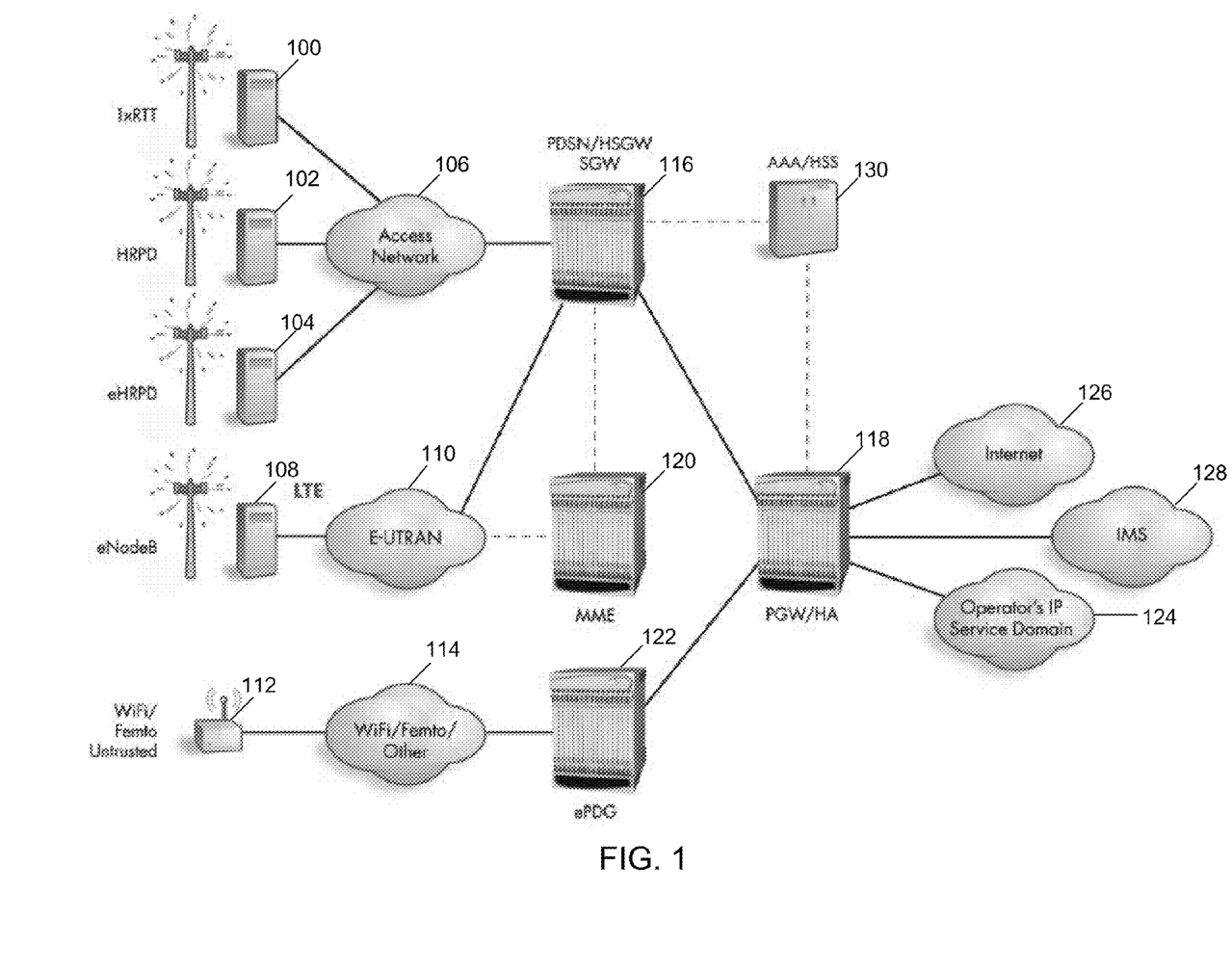
FIGS. 1-2 illustrate communication networks including a long term evolution (LTE) topology in accordance with some embodiments.

FIG. 1 illustrates a communication network that includes a selection mechanism in accordance with certain embodiments. FIG. 1 includes a number of radio access technologies such as a 1xRTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as WiFi, Femto, WiMAX, or any other radio spectrum technology can use transceiver 112 to connect to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1xRTT 100, the HSGW functionality can be used with HRPD 102 and eHRPD 104, and the SGW functionality can be used with the eNodeB 108. The access gateway 116 can communicate with an anchor gateway 118 which can implement a packet data network gateway (PGW) and a Home Agent (HA) and a mobility management entity (MME) 120. On the access network side, the anchor gateway 118 can also communicate with an evolved packet data gateway (ePDG) 122 which provides connectivity to the WiFi/Femto/other transceiver 112. On the packet core side, the anchor gateway can communicate with the operator's IP service domain 124, the internet 126, and IP multimedia subsystem (IMS) 128. An authentication, authorization, and accounting (AAA) server/ home subscriber server (HSS) 130 can communicate with the access gateway 116, the anchor gateway 118, or both.

The Home Subscriber Server (HSS) can be a master user database that supports IMS network entities that handle calls. The HSS stores subscription-related information (subscriber profiles), performs authentication and authorization of the user, and can provide information about the subscriber's location and IP information. The AAA server can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW), a serving gateway (SGW), an E-UTRAN (evolved-UMTS terrestrial radio access network), and a mobility management entity (MME). The SGW sits in the user plane where it forwards and routes packets to and from the eNodeB and Packet Data Network Gateway (PGW). The SGW also serves as the local mobility anchor for inter-eNodeB handover and mobility between 3GPP networks. The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept.

The ePDG 122 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the Packet Data Network Gateway (PGW) when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

The MME resides in the EPC control plane and manages session states, authentication, paging, mobility with 3GPP 2G/3G nodes, roaming, and other bearer management functions. The MME can be a standalone element or integrated with other EPC elements, including the Serving Gateway (SGW), Packet Data Network Gateway (PGW), and Release 8 Serving GPRS Support Node (SGSN). The MME can also be integrated with 2G/3G elements, such as the Serving GPRS Support Node (SGSN) and Gateway GPRS Support Node (GGSN). This integration is the key to mobility and session management interworking between 2G/3G and 4G mobile networks.

Figure 2:
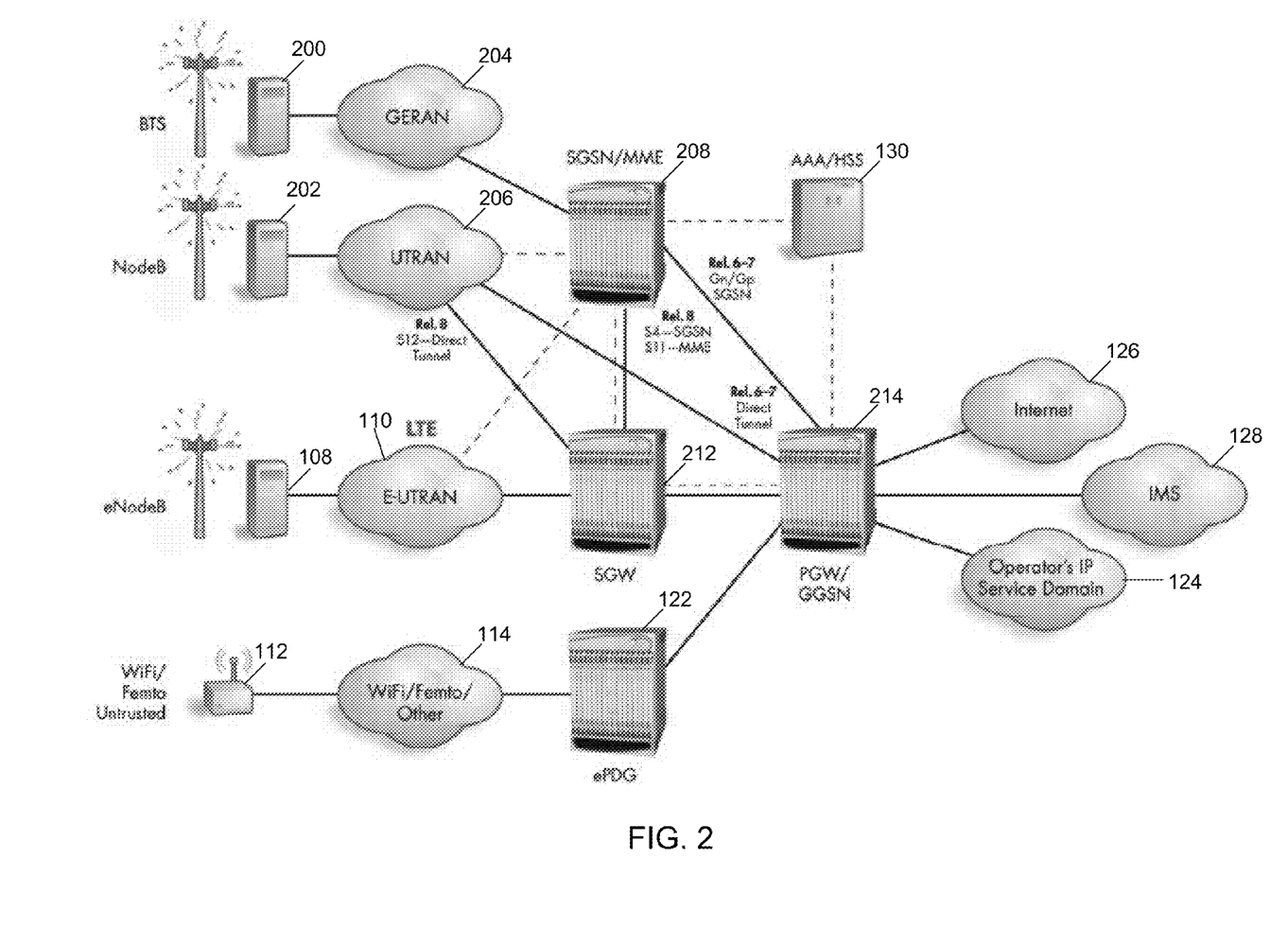

FIG. 2 illustrates a communication network that implements the selection mechanism with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214.

In some embodiments, the selection mechanism is implemented on a gateway such as an access gateway (AGW), a HRPD serving gateway (HSGW), a serving gateway (SGW), or a packet data network gateway (PGW). As described in more detail below, the gateway can implement multiple functionalities. In one embodiment, the selection mechanism is implemented on an HSGW for use in high rate packet data (HRPD) networks and evolved HRPD networks. The selection mechanism in a HSGW can be used to select a PGW. Some carrier installations use a model where the network is divided into different geographical regions and mobility is limited to intra-region handover. This is done to achieve local breakout and avoid backhauling of traffic to geographically distant PGWs. This kind of installation would require the HSGW to choose a new PGW during an inter-region handover and stick with the existing PGW during intra-region handover regardless of whether handover is inter-technology or intra-technology. An inter-technology handover can include a cellular network (e.g., LTE) to WiFi handoff, or any first technology radio access technology to a second technology radio access technology. As described above, the selection mechanism on the HSGW uses topological information to choose the topologically closest PGW.

The HSGW can be implemented with a local configuration and a FQDN using a hierarchical identification or a DNS can be used to resolve a region DNS label to determine the PGW selected. In the latter implementation, the HSGW can use the HRPD or eHRPD transceiver location using any of BSID, SID, NID or PZID and resolve it using DNS to get a region DNS label. The HSGW can further resolve the HRPD/eHRPD transceiver name (or APN) to get a list of PGW identities that serve that APN. The HSGW then does a longest suffix match of the region label from the previous step to get the PGWs that can serve that transceiver location. If more than one PGW match is found, then the HSGW can use additional algorithms to choose one of the matching PGWs. The additional algorithms can use load information, services required by the mobile device, or any other applicable information.

In the case of an initial attachment that prompts the dynamic PGW selection, the HSGW can send the APN FQDN to a DNS to resolve the APN FQDN. The DNS returns a list of PGW FQDNs that are matched against the configured HSGW FQDN or against the list region FQDNs returned by resolving the HRPD/eHRPD transceiver location. In the first selection methodology, the HSGW serves a designated geographical region and the PGWs can be selected on a basis of the HSGW that is selected. In the second selection methodology, the location of the attachment independent of the HSGW selected serves as the basis for the PGW selection. In this second methodology, HSGW geographical placement is not as important. For example, the HSGW can have cover multiple coverage areas or each HSGW can be assigned a large coverage area that overlaps with coverage areas of multiple other HSGWs. In such cases, the selection mechanism can be used for both the selection of the HSGW and the selection of the PGW at each stage to ensure geographical closeness and the minimization of backhauling network traffic to geographically distant network devices.

The HSGW selection of a PGW in a handover situation can use information obtained from an HSS/AAA. The HSS/AAA can return the PGW FQDN because the MME/PGW periodically updates the PGW identity in the HSS/AAA. After receiving the PGW FQDN at the HSGW, the HSGW can use the labels of the FQDN identifier to match against the configured FQDN at the HSGW or the region FQDN received from the DNS. The selection mechanism can then determine the PGW based on geographical closeness and other criteria such as loading. The selection can occur using an algorithm that calculates relative weights of each specified criteria to make a determination as to the PGW best suited for selection to provide services to the mobile device.

The selection mechanism and associated process can use resource records that are received from a DNS to resolve FQDNs, which are then used to determine selection of a network device. In some embodiments, resource records are exchanged with a DNS, which can include a combination of sending a receiving information. A DNS database is composed of a collection of resource records. Each resource record specifies information about a particular network device. For example, address mapping ("A") records can be used to map a host name to an IP address. The DNS uses these records to answer queries. With the selection mechanism, the "A" resource record is used to define IPv4 host address corresponding to fully qualified name of the host, while the "AAAA" resource record is used to define IPv6 host address corresponding to fully qualified name of the host. That is, these resource records can be used to associate the hierarchical identification with an IP address. This mapping that occurs allows IP addresses to be used to determine relative closeness of network devices by using the associated identifiers in the DNS database. For example, an IP address can be sent to the DNS and the DNS can resolve the identification and compare the identification to determine which other network devices are located nearby.

The DNS can then return the IP addresses along with the identification information of the network devices. A name authority pointer (NAPTR) can be used to perform a variety of lookup services with a DNS for a variety of resource names that are not in domain name syntax. A service (SRV) record defines services available at particular network devices, for example, http, ftp, etc. The S-NAPTR procedure (Straightforward-NAPTR) provides a way to resolve a domain name, application service name, and application protocol dynamically to obtain a network device or set of network devices using resource records. The above-mentioned resource records can be used in conjunction with a DNS to enable the selection process of network devices. The resolving process can obtain a specific service/protocol combination for a specific domain name and return Fully Qualified Domain Names (FQDN) of any available network devices.

In one specific embodiment, the HSGW receives the FQDN and strips the FQDN of any labels not relevant to selecting a PGW. For example, other information may be concatenated in the FQDN that is not needed by the selection mechanism. The stripped FQDN can then be sent to the DNS using S-NAPTR to try and get a match and a return of IP addresses. The DNS returns the NAPTR records including a replacement target pointing to the AAAA record for the PGW's S2a Interface. The replacement target is resolved using "AAAA" query to resolve to the IPv6 address of the s2a interface of the PGW. This then provides the identity of the PGW that can be used for servicing the mobile device. In the case where there is no PGW identity, the gateway, e.g., HSGW, can use the radio access point network identifier or an APN-NI from the mobile device or the default APN-NI from HSS (when the mobile device or UE does not include the APN in VSNCP Conf Req).

The vendor specific network control protocol configuration (VSNCP) request message can be used to send identification information received at the gateway to obtain a name or key for the radio access point. The form of the APN-FQDN can be "<APN-NI>.apn.epc.mnc<MNC>.mcc<MCC>.3gppnetwork.org". The HSGW can then use the S-NAPTR procedure with the APN-FQDN and "Service Parameter" of "x-3gpp-pgw:x-s2a-pmip" to obtain a list of PGW entries. The resulting PGW entries are compared against the configured HSGW FQDN and the longest suffix matching entry is chosen, and further resolved using "AAAA" Query to resolve to the IPv6 address of the s2a interface of the PGW. This IP addressed can be used to establish a connection with the PGW such that the PGW provides a connection to the IP core network. Alternatively, an "A" query to the DNS can be used to resolve the IPv4 address of the network device, such as the PGW, so a connection can be established over the network device.

Figure 3:
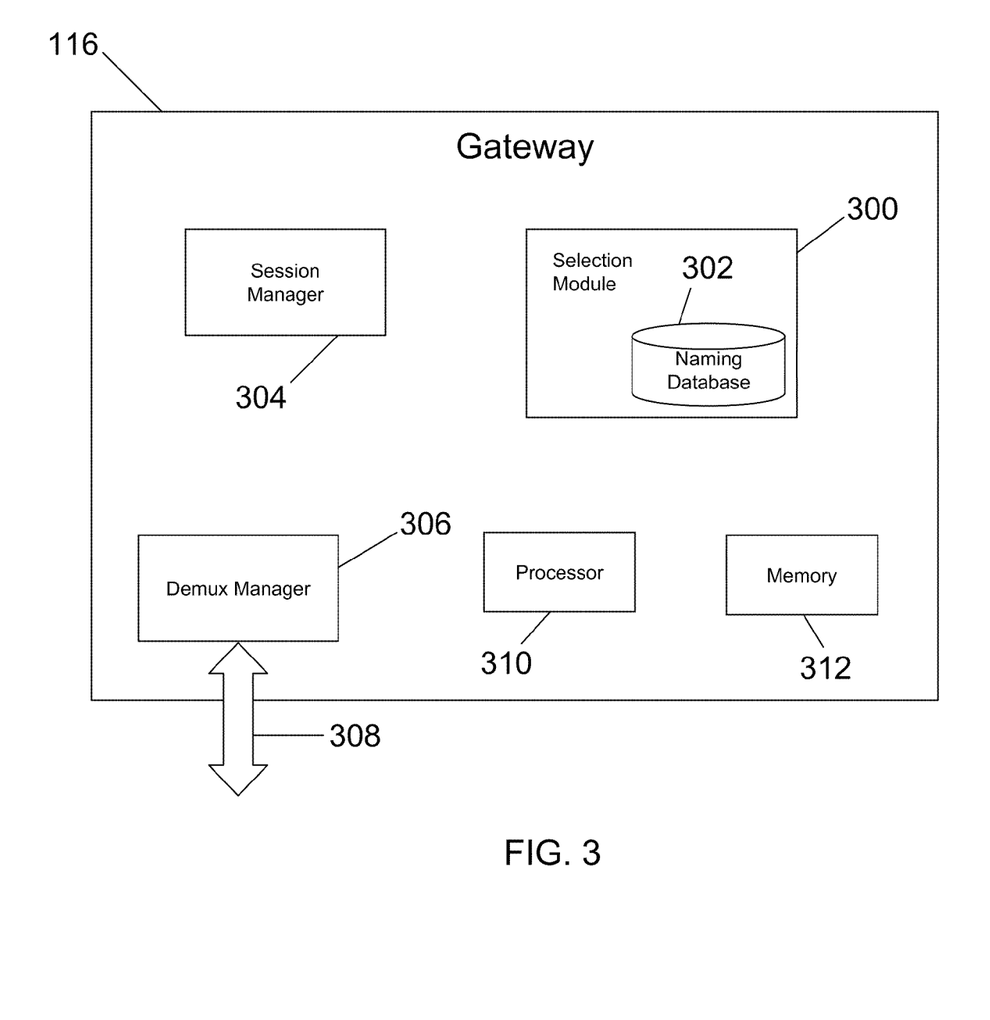
FIG. 3 illustrates a logical view of a gateway in accordance with some embodiments.

The selection mechanism can be implemented on a network device providing a gateway functionality. The network device can provide the advantages operators enjoy from the platform including quality performance in terms of subscriber/session density, transaction rates as well as traffic throughput. The platform also provides hardware and software resilience with no single point of failure as well as session recovery for even higher service availability. FIG. 3 illustrates a logical view of a gateway in accordance with certain embodiments. The gateway 116 includes a selection module 300, a naming database 302, a session manager 304, a demux manager 306, an interface 308, a processor 310, and a memory 312.

The selection module 300 can be implemented in software using memory 312 such as a computer readable medium, a programmable read only memory (PROM), or flash memory. The software can run on a processor 310 that executes instructions or computer code. The selection mechanism 300 may also be implemented in hardware using an application specific integrated circuit (ASIC), programmable logic array (PLA), or any other integrated circuit. The selection mechanism can also be dynamic or static. A dynamic selection mechanism can make a selection based on the conditions present at the time the selection needs to be made. A static selection is set so that the same network device is always selected, while a dynamic selection can vary the selection of the network device depending on the circumstances. In certain embodiments, the selection module 300 can be used to create names for base station location identifiers and/or PGWs located in the same region. These names or IDs can be arranged in a hierarchical fashion to allow comparison of IDs to determine the closeness of different IDs to one another.

The selection module 300 includes a naming database 302 that can store names. In some embodiments, the naming database 302 includes a locally configured name for the gateway that can be used in matching names to select a PGW. The naming database 302 can alternatively include a table for resolving base station names from an identifier and obtaining a list of PGWs names for use in a particular region. The obtaining can include receiving from a domain name server and temporarily storing the naming information in the naming database 302, while the selection module 300 compares the names in order to select a PGW for use in handling a session.

A session manager 304 can provide management of a session on the gateway. A session can include one or more connections for a subscriber in the service provider's network. A session can include information relating to the mobile device or user equipment as well as to each data connection established with the user equipment over the network. The session can include policy information, billing information, services to be provided, quality of service (QoS) information, and any other applicable information. Each session can share the processor 310 and memory 312 resources on the network device. The session manager 312 can work with other modules and components in the network device to ensure the session is handled appropriately. The session manager 312 can assign resources, perform tasks, and log information regarding the session. The demux manager 306 can select a session manager for incoming requests and can route control messages to the appropriate a session manager for a particular subscriber.

An interface 308 can provide an input and/or output mechanism to communicate with the gateway. The interface can allow communication with user equipment, domain name servers, other gateways as well as to send and receive data in the network. The interface can be implemented in hardware to send and receive signals in a variety of mediums, such as optical, copper, and wireless and in a number of different protocols some of which may be non-transient signals.

User Equipment and Network Device

The mobile device or user equipment described above can communicate with a plurality of radio access networks using a plurality of access technologies. The mobile device can be a smartphone offering advanced capabilities such as word processing, web browsing, gaming, e-book capabilities, an operating system, and a full keyboard. Operating systems that can be used on the mobile device include Symbian OS, iPhone OS, RIM's BlackBerry, Windows Mobile, Linux, Palm WebOS and Android. The screen may be a touch screen that can be used to input data to the mobile device and the screen can be used instead of the full keyboard. The mobile device can also keep global positioning coordinates or other location information in its stack or memory, which can be sent to the network for use by the selection mechanism.

The mobile device can include one or more antennas that are configured to transmit and receive data on a radio frequency with a plurality of radio access networks and/or access technologies. The one or more antennas can be used to send and receive data flows over a plurality of access technologies. For example, the at least one antenna can receive the first data flow and the second data flow on a first access technology, and also receive the first data flow on the first access technology and the second data flow on the second access technology at the same time. The mobile device can be configured with one or more processors that process instructions to modulate data on a first access technology and a second access technology and to process a first data flow and a second data flow received from the at least one antenna. The processors can also communicate with a computer readable medium used for storage such as programmable read only memory. The processor can be any applicable processor such as a system-on-a-chip that combines a CPU, an application processor, and flash memory. The processor can also be used in combination with the antenna to attach to a first and a second access technology simultaneously and to receive a data flow from a first access technology and a data flow from a second access technology at the same time. The processor can also compile user preferences regarding how certain types of data flows are transmitted to the mobile device and communicate these preferences to the network, such as the access gateway.

The selection mechanism described above can be implemented on a network device providing a gateway functionality. The network device can perform multiple and different integrated functionalities. In some embodiments, a packet data network gateway (PGW), a serving gateway (SGW), Gateway General packet radio service Support Node (GGSN), a serving GPRS support node (SGSN), an HRPD serving gateway (HSGW), a packet data serving node (PDSN), a foreign agent (FA), or home agent (HA) can be implemented on a gateway. Other types of functionalities can also be implemented on a gateway in other embodiments are a packet data inter-working function (PDIF), an access service network gateway (ASNGW), a base station, a access network, a User Plane Entity (UPE), an IP Gateway, an mobility management entity (MME), a packet data network gateway (PGW), a serving gateway (SGW), a session initiation protocol (SIP) server, a proxy-call session control function (P-CSCF), and an interrogating-call session control function (I-CSCF). In certain embodiments, one or more of the above-mentioned other types of functionalities are integrated together or provided by the same network device.

The network device can also support sessions originated from a Femto base station, which would connect to the gateway using a broadband network. A person or corporation may use a Femto base station in a home or business to support one or more UEs. The gateway can provide trigger based traffic management during a handoff from a Femto base station to a macro base station, while maintaining traffic management for the user equipment. If the network device based gateway is implementing an offload gateway, then the gateway can be implemented as any combination of the following including an xGSN, an xGW, an xGW-SGW, and an xGW-PGW.

Figure 4:
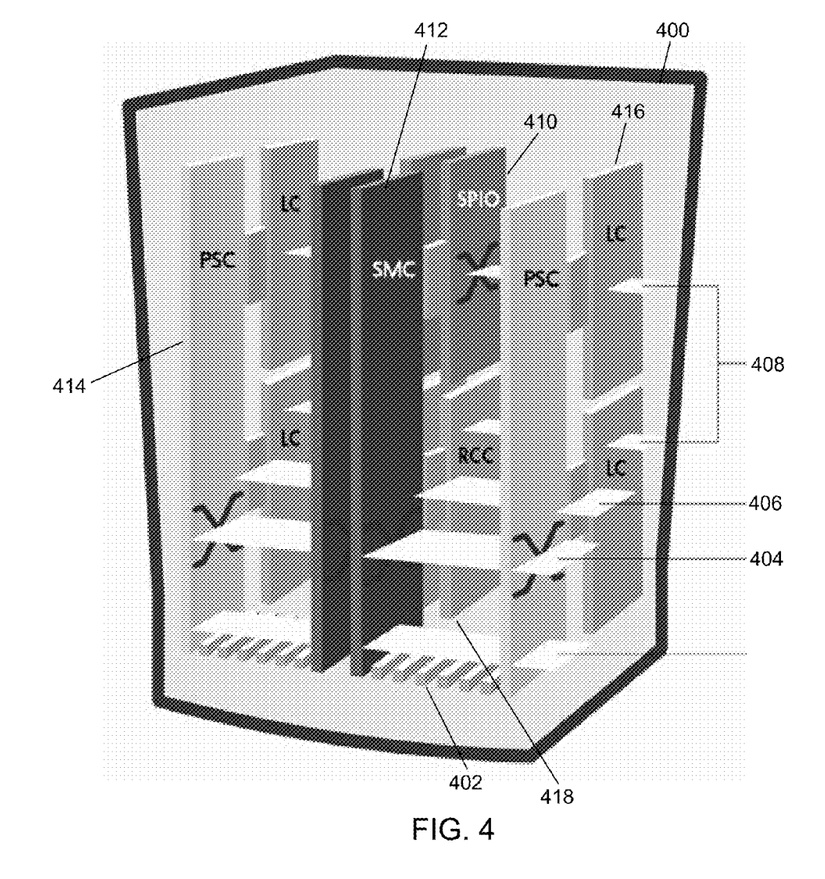
FIG. 4 illustrates the implementation of a network device in accordance with some embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 4 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group of users another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a user equipment, the session subsystem can setup a MIPv4 termination and setup a PMIPv6 session towards the core network. A session manager can track the mapping of the sessions and processing to provide the emulation and inter-working between the networks. A database can also be used to map information between the sessions, and store, for example, NAI, HoA, AE information in some embodiments.

Figure 5:
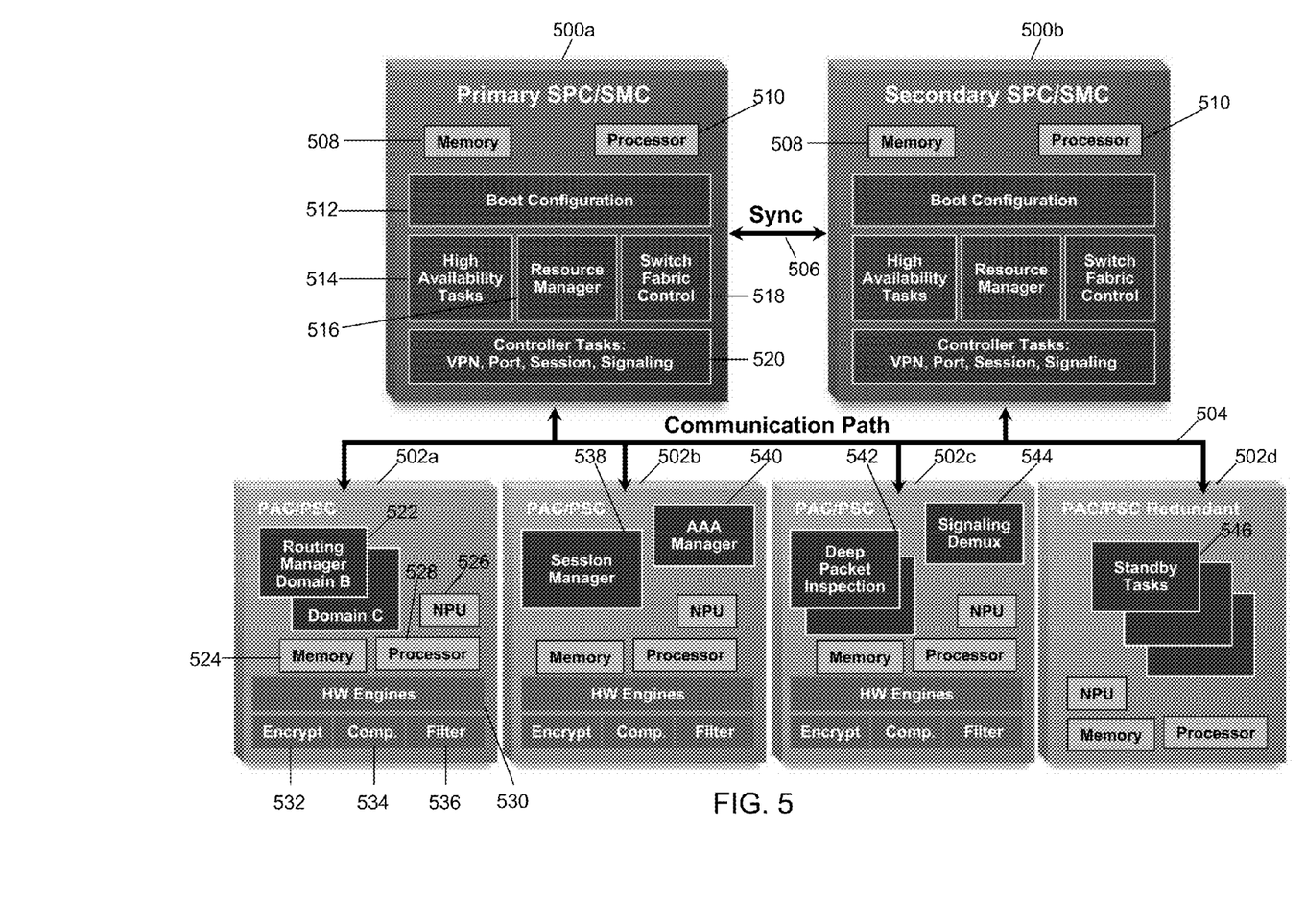
FIG. 5 illustrates a logical view of the software architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 5 illustrates a logical view of the software architecture of a network device in accordance with certain embodiments. As shown, the software and hardware can be distributed within the network device and across different circuit boards, processors, and memory. FIG. 5 includes a primary switch processor card (SPC)/system management card (SMC) 500a, a secondary SPC/SMC 500b, PAC/PSC 502a-502d, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502a provides routing managers 522 with each covering routing of a different domain. PAC/PSC 502b provides a session manager 538 and an AAA manager 540. The session manager 538 manages one or more sessions that correspond to one or more user equipment. A session allows a user equipment to communicate with the network for voice calls and data. The AAA manager 540 manages accounting, authentication, and authorization with an AAA server in the network. PAC/PSC 502 provides a deep packet inspection task 542 and a signaling demux 544. The deep packet inspection task 542 provides inspection of packet information beyond layer 4 for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, LTE functionality such as a PDN gateway can be combined or co-located with the MME.

We claim:

1. A method comprising:
   receiving an initial attachment at a gateway including an identifier of a radio attachment point;
   obtaining a name for the radio attachment point based on the identifier;
   accessing a list of names of packet data network gateways (PGWs) that can serve the initial attachment to provide a network connection;
   comparing the name for the radio attachment point with the list of names of the PGWs to determine at least one PGW having a selected PGW name with labels reflecting topological location of the at least one PGW, that provides a desirable match to the name for the radio attachment point, wherein the name for the radio attachment point has labels reflecting topological location of the radio attachment point and the selected PGW name that provides the desirable match has the greatest number of matching labels with the name for the radio attachment point; and
   selecting at least one PGW that provides the desirable match to establish the network connection.

2. The method of claim 1, wherein the name of the PGW is a fully qualified domain name (FQDN) that includes a hierarchical structure that provides an indication of topographical distance when compared to a second name that includes a hierarchical structure.

3. The method of claim 1, further comprising storing the list of PGW names locally at the gateway.

4. The method of claim 1, further comprising:
   receiving a handover request at the gateway; and
   comparing a portion of PGW name handling the connection with configured name at the gateway to determine if a new PGW is selected to handle the connection.

5. The method of claim 4, wherein the handover request is for an inter-technology handoff.

6. The method of claim 1, further comprising selecting a PGW when more than one PGW name provides a same matching level that indicates each serves a common geographical region by using a selection algorithm to choose the PGW.

7. The method of claim 1, wherein the gateway includes a serving gateway.

8. The method of claim 1, further comprising sending the identifier of the radio attachment point to a domain name server (DNS) to obtain the list of PGW names that serve that radio attachment point.

9. A gateway comprising:
   an interface configured to receive an initial attachment at a gateway including an identifier of a radio attachment point;
   a selection module implemented on a processor and memory, wherein the selection module is configured to obtain a name for the radio attachment point based on the identifier and a list of names of packet data network gateways (PGWs) that can serve the radio attachment point at that location, and compare the name of the radio attachment point with the names of the PGWs to determine at least one PGW having a selected PGW name reflecting topological location of the at least one PGW that provides a desirable match to the name for the radio attachment point, wherein the selection module resolves the identifier of the radio attachment point into a name with labels reflecting topological location of the radio attachment point and the selected PGW name that provides the desirable match has the greatest number of matching labels with the name for the radio attachment point; and
   a session manager configured to receive information from the selection module and establish a network connection with the at least one PGW whose name provides the desirable match.

10. The gateway of claim 8, wherein the name of the PGW is a fully qualified domain name (FQDN) that includes a hierarchical structure that provides an indication of topographical distance when compared to a second name that includes a hierarchical structure.

11. The gateway of claim 8, wherein the list of PGW names is stored in the memory.

12. The gateway of claim 8, wherein a handover request is received on the interface and the selection module is configured to compare a portion of PGW name handling the connection with a name configured for the gateway to determine if a new PGW is selected to handle the connection.

13. The gateway of claim 8, wherein the selection module includes a selection algorithm to select a PGW when more than one PGW name provides a same matching level that indicates each serves a common geographical region as the radio attachment point.

14. The gateway of claim 8, wherein the interface is used to communicate with a domain name server (DNS) to obtain a list of PGW names that serve the radio attachment point.

15. A non-transitory computer readable medium having executable instructions operable to perform operations comprising:

receive an initial attachment at a gateway including an identifier of a radio attachment point;
  obtain a name for the radio attachment point based on the identifier;
  access a list of names of packet data network gateways (PGWs) that can serve the initial attachment to provide a network connection;
  compare the name for the radio attachment point with the list of names of the PGWs to determine at least one PGW having a selected PGW name with labels reflecting topological location of the at least one PGW that provides a desirable match to the name for the radio attachment point, wherein the name for the radio attachment point has labels reflecting the topological location of the radio attachment point and the selected PGW name that provides the desirable match has the greatest number of matching labels with the name for the radio attachment point; and
  select at least one PGW that provides the desirable match to establish the network connection.

16. The computer readable medium of claim 15, wherein the name of the PGW is a fully qualified domain name (FQDN) that includes a hierarchical structure that provides an indication of topographical distance when compared to a second name with a hierarchical structure.

17. The computer readable medium of claim 15, further comprising:

receiving a handover request at the gateway; and
  comparing a portion of PGW name handling the connection with a name configured for the gateway to determine if a new PGW is selected to handle the connection.

18. The computer readable medium of claim 15, further comprising sending the identifier of the radio attachment point to a domain name server (DNS) to obtain the list of PGW names that serve that radio attachment point.

* * * * *